O. W. CLARK.

ELEVATOR-BUCKET.

No. 7,020. Reissued March 28, 1876.

WITNESSES

E. F. Nottingham.

F. O. McCleary

INVENTOR

Orrow W. Clark,

By Leggett & Leggett Attorneys

N. PETERS, PHOTO-LITHOGRAPHER, WASHINGTON, D. C.

UNITED STATES PATENT OFFICE.

ORSON W. CLARK, OF APPLETON, WISCONSIN.

IMPROVEMENT IN ELEVATOR-BUCKETS.

Specification forming part of Letters Patent No. 80,602, dated August 4, 1868; reissue No. 7,020, dated March 28, 1876; application filed March 20, 1876.

*To all whom it may concern:*

Be it known that I, O. W. CLARK, of Appleton, in the county of Outagamie and State of Wisconsin, have invented a new and useful Improvement in Elevator-Buckets, which improvement is fully set forth in the following specification, reference being had to the accompanying drawings.

The nature of my invention relates to improvements in elevator-buckets, the object of which is to make them more durable, less liable to catch in the cases, and to make them of greater capacity. The elevator-buckets, as at present constructed, are square at the top, presenting acute angles at the front corners, the sides being at right angles to the back.

The elevator-cases, in which they run, are generally made square, and are of considerable length, necessitating the joining of the ends of the boards of which they are made. It not unfrequently happens that these joints become loose and somewhat detached, the lower end of the upper board projecting inward from the side of the case farther than the upper end of the lower board; and while the cases are constructed with considerable greater breadth than the buckets, to allow sufficient freedom for the buckets, it not unfrequently happens that the belts become slightly twisted, whereby the buckets will swing around so as to catch under at their outer corners these projections, the result of which is very disastrous to them, and it is found that when they do so they always bend or break at the angles. It also sometimes happens that the belts run untruly on their pulleys, and are thereby drawn to one side, whereby the same result occurs. It sometimes also happens that sticks or stones, or other foreign matter, get into the grain and get cramped between the buckets and the cases. However any undue strain may occur to the buckets it is almost always found that they fail at the said acute angles in strength.

My invention consists, first, in an elevator-bucket, having its front portion formed with rounded corners, whereby the tendency of the bucket to catch in the elevator-cases is obviated; second, in an elevator-bucket, having its front portion formed with rounded corners, the bucket constructed of such form that its size gradually decreases from top to bottom; third, in an elevator-bucket, having its front and sides formed of a single piece of metal, thereby dispensing with joints on its wearing-surface.

Figure 1:
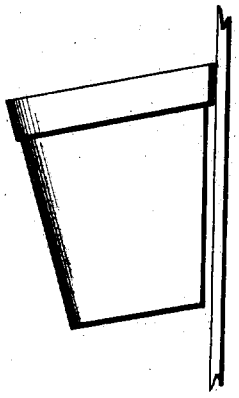
Figure 2:
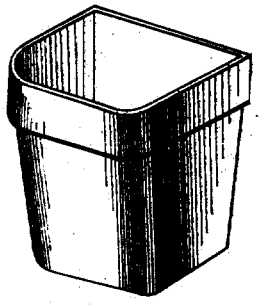
Figure 3:
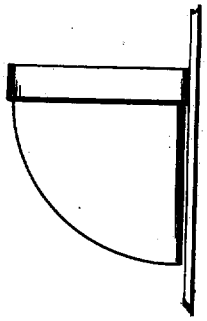

On reference to the accompanying drawings, Figure 1 represents a side elevation of my improved bucket. Fig. 2 is a perspective view, and Fig. 3 a side elevation, of a bucket as commonly constructed.

In consequence of being made narrower in front, as is shown in Fig. 2, my improved bucket is not so liable to the before-mentioned catching action on the sides of the cases, and by reason of the rounded corners will not catch in the corners of the cases, and is very materially stronger, and the expense of two joints is also saved, and the capacity is increased by reason of the configuration of the front face and bottom.

Having fully described my invention, what I claim as new, and desire to secure by Letters Patent, is—

1. An elevator-bucket, the front portion of which is formed with rounded or curved corners, substantially as and for the purpose set forth.

2. An elevator-bucket, its front portion formed with rounded corners, the bucket constructed of a form to decrease in size from top to bottom, substantially as and for the purpose set forth.

3. An elevator-bucket, having its front and sides formed of a single continuous piece of metal, substantially as and for the purpose set forth.

In testimony that I claim the foregoing I have hereunto set my hand and seal this 10th day of March, 1876.

ORSON W. CLARK. [L. S.]

Witnesses:

HERMAN ERB,

ARTHUR SEBERWELL.